United States Patent [19]

King et al.

[11] Patent Number: 4,643,880
[45] Date of Patent: Feb. 17, 1987

[54] APPARATUS AND PROCESS FOR CARBON BLACK PRODUCTION

[75] Inventors: William R. King; C. Jack Hart, both of Bartlesville, Okla.

[73] Assignee: Phillips Petroleum Company, Bartlesville, Okla.

[21] Appl. No.: 681,969

[22] Filed: Dec. 14, 1984

[51] Int. Cl.⁴ .............................................. C09C 1/48
[52] U.S. Cl. .................................................. 422/156
[58] Field of Search ...................... 422/150, 151, 156

[56] References Cited

U.S. PATENT DOCUMENTS

| | | | |
|---|---|---|---|
| 2,976,127 | 3/1961 | Latham | 422/150 |
| 3,012,864 | 12/1961 | Latham, Jr. et al. | 23/259.5 |
| 3,222,136 | 12/1965 | Hess et al. | 23/259.5 |
| 3,256,065 | 6/1966 | Latham | 422/150 |
| 3,567,395 | 3/1971 | Henderson et al. | 23/259.5 |
| 3,701,827 | 10/1972 | Dahmen | 423/456 |
| 3,922,335 | 11/1975 | Jordan et al. | 423/450 |
| 4,026,670 | 5/1977 | Henderson | 422/150 |
| 4,106,912 | 8/1978 | Dollinger et al. | 23/259.5 |
| 4,179,494 | 12/1979 | Rothbühr et al. | 423/456 |
| 4,289,743 | 9/1981 | Ruble | 423/450 |

FOREIGN PATENT DOCUMENTS 1359216  7/1974  United Kingdom .

Primary Examiner—Peter Chin
Attorney, Agent, or Firm—John R. Casperson

[57] ABSTRACT

An air distributor for carbon black reactor in which the air is brought radially inwardly toward the reactor axis is disclosed in which the incoming air is diverted in an upstream direction and flowed around the end of and into a tubular member to achieve distribution.

8 Claims, 2 Drawing Figures

APPARATUS AND PROCESS FOR CARBON BLACK PRODUCTION

BACKGROUND OF THE INVENTION

In one aspect, the invention relates to a gas distributor. In another aspect, the invention relates to a carbon black reactor. In yet another aspect, the invention relates to a process for producing carbon black.

Many present commercial reactors for carbon black production utilize tangential air entry and axial oil entry. Newer generation reactors utilize axial air entry and have the capabilities of utilizing either or both axial and radial oil entries. An advantage of the newer reactors is their ability to produce low grit content carbon black. A problem encountered in scale up of small reactors to large ones is that of poor air distribution at the upstream end of the reactor. Poor air distribution can cause unstable combustion and will usually lead to poor predictability of resultant product properties. An air distributor for an axial flow reactor which is easy to scale up and adapt to any size reactor and provides stable combustion would clearly be very desirable.

OBJECTS OF THE INVENTION

It is an object of this invention to provide a gas distributor for use in an oil furnace such as a carbon black reactor.

It is another object of this invention to provide a carbon black reactor having improved air distribution.

It is a further object of this invention to provide a process for the production of carbon black in which the oxidant gas is introduced into the reactor in an efficient and easily replicated manner.

STATEMENT OF THE INVENTION

In one aspect of the invention, there is provided a carbon black reactor. The reactor has a precombustion zone having a first end and a second end for the combustion of a fuel with an oxidant gas to form hot gases having a temperature sufficiently high to decompose a carbonaceous feedstock to form carbon black. The precombustion zone is refractory lined to withstand the high temperatures generated by the combustion process. A first tubular member extends upstream from the upstream end of the precombustion zone. The first tubular member has a longitudinal axis coaxially positioned with respect to the longitudinal axis of the precombustion zone, a first end and a second end. The second end of the first tubular member is positioned adjacent to the first end of the precombustion zone. The first tubular member preferably has an inside diameter which is similar to the inside diameter of the precombustion zone so that gas velocities between the inside of the first tubular member and the precombustion zone will not vary greatly. A second tubular member is provided which surrounds the first tubular member. An annulus is defined between an outside diameter of the first tubular member and the inside diameter of the second tubular member. The second tubular member is coaxially positioned with respect to the longitudinal axis of the precombustion zone. The second tubular member has a first end and a second end. The second end of the second tubular member is positioned adjacent to the first end of the precombustion zone. A closure is attached to the second end of the second tubular member. The closure is spaced apart from the second end of the first tubular member so as to define a fluid flow path. At least one tunnel opens through the second tubular member into the annulus between the first tubular member and the second tubular member in a generally radially inward direction toward the longitudinal axis of the precombustion zone. The longitudinal position at which the tunnel opens into the annulus is such that it falls between the first end of the first tubular member and the second end of the first tubular member.

Desirably, the reactor is operated for carbon black production. In one such process, a stream of oxidant gas is flowed radially inwardly toward the longitudinal axis of a reactor having a longitudinal axis, an upstream end, and a downstream end. The oxidant gas is flowed into an annulus coaxially positioned with respect to the longitudinal axis of the reactor. The oxidant gas is then flowed in an upstream direction along the annulus to the upstream end of the reactor and then generally radially inwardly from the annulus at the upstream end of the reactor. The oxidant gas then follows a path having a generally circular cross section from the upstream end of the reactor to the downstream end of the reactor. A fuel is introduced into the stream of oxidant gas as it flows toward the downstream end of the reactor and combusted therewith to form hot gases having a temperature sufficiently high to decompose a carbonaceous feedstock and form carbon black. A carbonaceous feedstock is subsequently introduced into the hot gases resulting in its decomposition and the formation of carbon black which is subsequently collected.

DETAILED DESCRIPTION OF THE INVENTION

Figure 1:
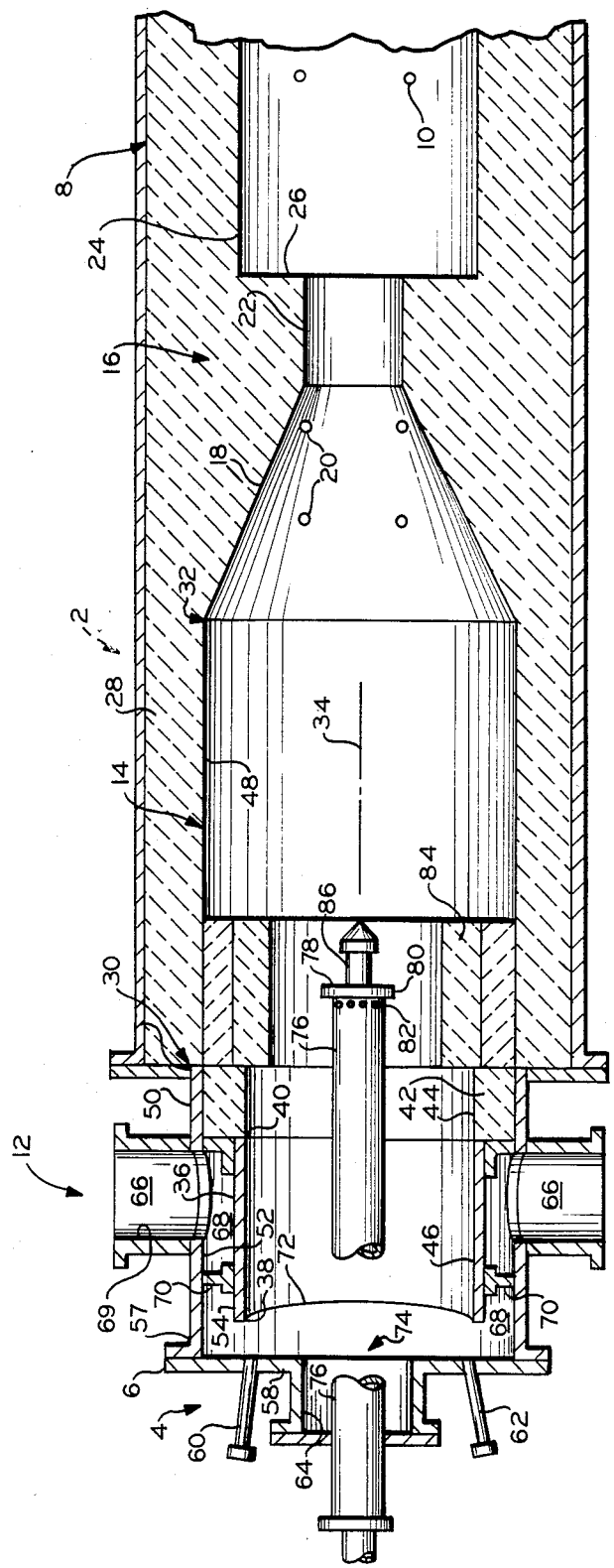
FIG. 1 is a sectional view of a portion of an apparatus embodying certain features of the present invention.
Figure 2:
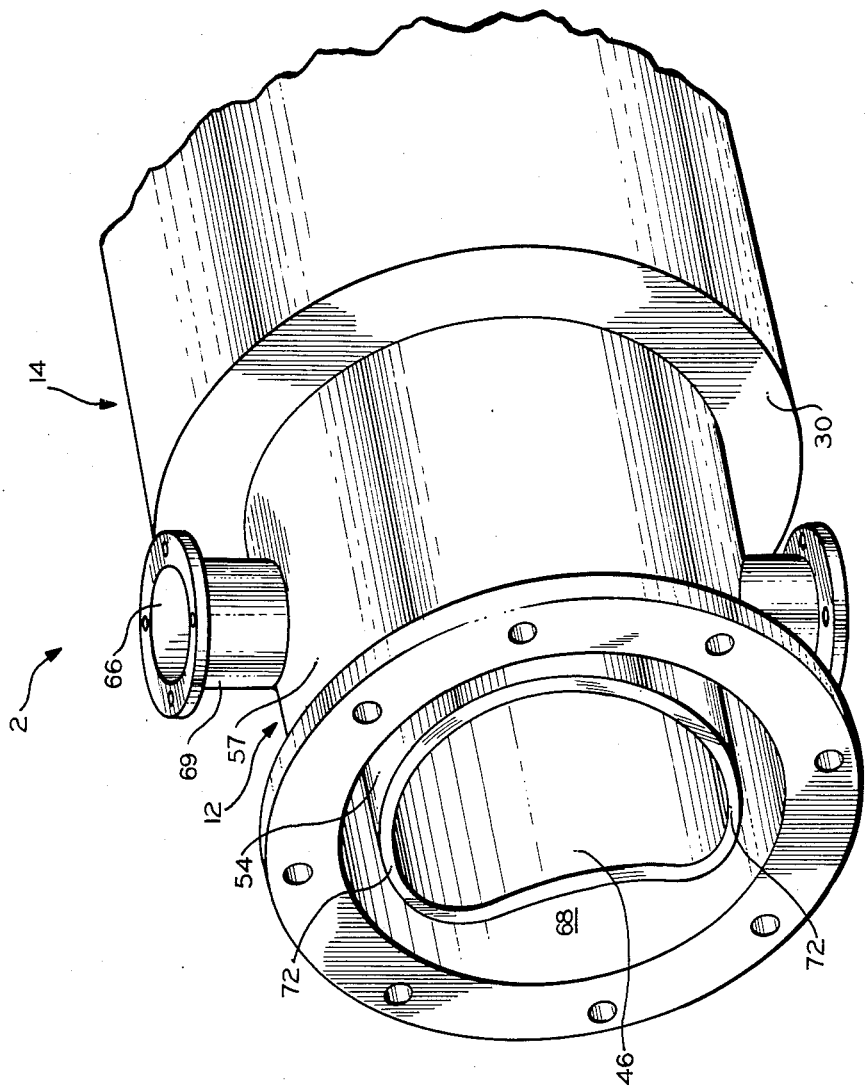
FIG. 2 is a pictorial representation of a device shown in cross-sectional view in FIG. 1 with a portion thereof being removed to shown internal details.

According to certain aspects of the invention, a carbon black reactor 2 has an upstream end 4 determined by an upstream end wall closure 6 and downstream end 8 determined by the location of a quench inlet 10 for the introduction of a pre-quench fluid to terminate the carbon forming reaction. The reactor 2 comprises, from upstream to downstream, an oxidant gas distribution section 12 which can be formed from a metal such as steel, a generally cylindrical precombustion zone 14, and a pyrolysis zone 16 having a generally circular cross section. In a preferred embodiment, the pyrolysis zone 16 is formed from a sidewall determining a generally frustoconical converging section 18 having radially inwardly directed oil ports 20 opening through the sidewall, a generally cylindrical reactor throat 22, and a generally cylindrical reactor zone 24. And abrupt expansion 26 in the reaction flow passage connects the throat 22 with the reaction section 24.

The generally cylindrical precombustion zone 14 is preferably lined with a refractory material 28 to resist the high temperatures involved where fuel is combusted with an oxidant gas to form hot gases having a temperature sufficiently high to decompose a carbonaceous feedstock and form carbon black. The generally cylindrical precombustion zone has a first upstream end 30, a second downstream end 32 and a longitudinal axis 34 which coincides preferably with a longitudinal axis of the reaction zone 24 and the hereinafter described distributor 12.

A first tubular member 36 extends toward the upstream end 4 of the reactor from the upstream first end 30 of the precombustion zone 14. The first tubular member 36 has a longitudinal axis preferably coaxially positioned with respect to the longitudinal axis 34 of the precombustion zone. The first tubular member 36 has a first end 38 and a second end 40. The second end 40 is preferably positioned adjacent to the first end 30 of the precombustion zone 14. In a preferred embodiment of the invention, the tubular member 36 is connected to the precombustion zone 14 via a short refractory section 42 having a generally cylindrical inside surface 44 corresponding to an inside surface 46 of the tubular member 36. The diameter determined by the inside surfaces 46 and 44 is preferably similar to the inside diameter defined by an inside surface 48 of the generally cylindrical precombustion zone 14. Generally speaking, the diameter determined by the surface 46 will be in the range of from 50 to 200 percent of the diameter determined by the surface 48, usually in the range of from 75 to 150 percent of the diameter determined by surface 48, preferably from about 75 to about 125 percent of the diameter determined by the surface 48.

A second tubular member 50 surrounds the first tubular member 36. The second tubular member 50 has an inside surface 52 which forms an annulus with respect to the outside surface 54 of the first tubular member 36. The second tubular member 50 has a longitudinal axis which is positioned coaxially with respect to the longitudinal axis 34 the precombustion zone 14. The second tubular member 50 has a first end 56 and a second end 57. The first end 56 is preferably positioned adjacent to the first end 30 of the precombustion zone 14.

A closure 58 is attached to the second end 57 of the second tubular member 50. The closure 58 is spaced apart from the second end 38 of the first tubular member 36. If desired, fittings for pipe sight glasses 60 and 62 can be provided in closure 58 as well as a fitting 64 for the receipt of hereinafter described gas and oil tubes.

At least one tunnel 66 opens through the second tubular member 50 into an annulus 68 defined between the outside surface 54 of the first tubular member 36 and the inside surface 52 of the second tubular member 50. Each tunnel 66 can be defined by a tubular member 69 which is connected to the second tubular member 50. Each tunnel 66 opens into the annulus at a longitudinal position which falls between the first end 38 and the second end 40 of the first tubular member 36. Preferably, the annulus 68 commences at the upstream end of the refractory material defining the hot section of the reactor. If desired, a support spider formed from brackets 70 can position the first tubular member 36 in the second tubular member 50. Preferably, the first tubular member 36 slides in the support spider to allow for temperature expansion.

For good distribution, a plurality of tunnels 66 preferably open into the annulus 68 through the wall of the second tubular member 50. Each of the tunnels opens into the annulus at a longitudinal position falling between the first end 38 and the second end 40 of the first tubular member 36. For good distribution, each tunnel 66 is generally circumferentially equally spaced from each of the other tunnels. Preferably, two tunnels 66 which are opposed to each other are used because two tunnels have been used with good results.

To further improve air distribution, the second end 38 of the first tubular member 36 can be provided with cutouts or scallops or, in the case of two tunnels 66, a saddle 72. The cutout is circumferentially oriented or offset with respect to each tunnel 66 so that the maximum depth of the cutout or scallop falls between the center lines of the tunnels 66, when viewed from the perspective of the point of intersection of the longitudinal axis of the reactor and the closure 58. This perspective point is called out by the reference numeral 74 in FIG. 1.

Fuel and make oil can be introduced into the reactor 2 through the end wall 58 via the fitting 64. Preferably, an axial tube 76 for the introduction of fuel extends through the closure 58 and empties into the precombustion zone 14. The end of the tube 76 is preferably closed by plate 78 forming a flange 80 on the end of the tubular member 76 and the fuel is emitted upstream of the flange 80 through radially outwardly directed apertures 82. Preferably, the precombustion zone 14 is provided with a choke section 84 formed from a refractory material which is positioned adjacent to the first end 30 of the precombustion zone 14. The apertures 82 in the fuel gas tube open into the reactor at a longitudinal position which is spaced radially inward from choke 84. If desired, an oil tube 86 can be coaxially positioned within the gas tube 76. The oil tube can protrude from the downstream end of the gas tube 76 as determined by the flange 80 well into the precombustion zone 14 if desired.

According to further aspects of the present invention there is provided a process for producing carbon black. In the process, a stream of oxidant gas is flowed radially inward toward the longitudinal axis of the reactor having longitudinal axis, an upstream end and a downstream end. The gas is flowed into an annulus, such the annulus 68 from a radially inward path such as determined by the tunnel 66. The annulus 68 is coaxially positioned with respect to the longitudinal axis of the reactor. The oxidant gas is then flowed in an upstream direction with respect to the downstream end of the reactor along a generally annular flow path to the upstream end of the reactor. At the upstream end of the reactor, the oxidant gas is flowed generally radially inwardly from the annulus and into a flow path of generally circular cross section extending from the upstream end of the reactor to the downstream end such as from upstream end 6 to downstream end 8 of the reactor 2. A combustible fuel can be introduced into the stream of oxidant gas as it flows toward the downstream end of the reactor for combustion with the oxidant gas to form hot gases having a temperature sufficiently high to decompose a carbonaceous feedstock to form carbon black. Preferably, such combustion would occur in a precombustion zone such as a refractory-lined zone 14. A carbonaceous feedstock can then be introduced into the hot gases and the carbon black formed by the resultant decomposition can be collected as is conventionally known in the art after being quenched to below carbon forming temperature such as by quench fluid, steam or the like, introduced into the reaction flow path via the ports 10.

Where the fluid distributor 12 is sufficiently separated from the combustion process, it can be relatively inexpensively formed from a suitable metal such as steel. It is therefore preferable that the combustion of fuel with oxidant gas occur downstream of the point where the oxidant gases are brought radially inward into the annular flow path leading upstream since a main objective of the invention is gas distribution, rather than heat exchange. By flowing the oxidant gas through scallops or cutouts on the end of a tubular member which separates the upstream and downstream flow paths of the oxidant gas, fluid distribution can be greatly improved to result in stable combustion and a highly desirable process with easily replicated results. To maintain a low pressure drop, a portion of the oxidant gas flowing in the upstream direction in the annular flow path can be caused to follow a helical path generally of an angle equal to one-half of the angle between tunnel central lines, as measured circumferentially. Preferably, there is one scallop or cutout in the tubular member for each tunnel for the introduction of oxidant gas.

The carbonaceous feedstock can be introduced axially into the hot gases such as from the end of the tubular member 86. If desired, the carbonaceous feedstock can be introduced generally radially inwardly into the hot gases in addition or alternatively to the axial introduction due to the provision of the ports 20.

EXAMPLE

A primary air entry was fabricated for bolting to the face plate of an existing reactor. The outer tubular member 50 was formed from 29 inch O.D. carbon steel pipe with a ⅜ inch thick wall. The pipe 50 was 25 inches long. One end of the pipe was attached to the reactor face plate. The other end of the pipe was fitted with a 35 inch O.D. by 29⅛ inch I.D. carbon steel flange. A pair of opposed air entries through the pipe 50 were formed from 8 inch Schedule 40 carbon steel pipe which was provided with an 8 inch, 150 pound carbon steel flange for affixation to the air source. The inner tubular member 36 was attached to the outer tubular member 50 by welding to a 3 inch by 3 inch by ¼ inch circular angle iron formed from 310 stainless steel. The first tubular member 36 was formed from a 23 inch pipe having a ½ inch wall thickness formed from 310 stainless steel. One leg of the angle iron was lapped and welded to the inner pipe. The end of the other leg of the angle iron was welded to the outer pipe so that the leg formed the upstream end of the annular flow path. (Downstream end with respect to the downstream end of the reactor). The pipe sight glasses were formed from 2 inch Schedule 40 pipe and aligned so that their axes converged in the reactor throat. The fitting 64 was formed from 10 inch Schedule 40 carbon steel pipe. An existing oil and gas tube assembly as illustrated was utilized.

The flanges on the 8 inch air tunnels were positioned 1 ft. 8 inches from the reactor center line.

The annular space between the angle iron and the reactor face plate was packed with A. P. Green refractory.

That which is claimed is:

1. A carbon black reactor having an upstream end, a downstream end, and a longitudinal axis extending between the upstream end and the downstream end, said reactor comprising, from the upstream end to the downstream end, a means defining an oxidant gas distributor section, a refractory means defining a generally cylindrical precombustion zone, and a refractory means defining a pyrolysis zone, all said means being serially connected and in axial alignment and together defining a flow path of generally circular cross section extending along the longitudinal axis of the carbon black reactor, and a means for introducing a fuel gas into the generally cylindrical precombustion zone;

wherein the means defining the oxidant gas distributor section comprises a first tubular member having an upstream end which defines the upstream end of the flow path and a downstream end which connects to the refractory means defining the generally cylindrical precombustion zone;

a second tubular member coaxially positioned around the first tubular member to define an annulus between the first tubular member and the second tubular member; said second tubular member having a first end and a second end, the second end of the second tubular member being connected to the refractory means defining the generally cylindrical precombustion zone;

a means for defining at least one tunnel opening into the annulus generally radially inwardly toward the longitudinal axis of the carbon black reactor; and a closure attached to the first end of the second tubular member and defining the upstream end of the carbon black reactor, said closure being spaced apart from the upstream end of the first tubular member to provide a flow path from the means defining the at least one tunnel to the pyrolysis zone;

wherein the refractory means defining the pyrolysis zone defines a generally frustoconical converging section having generally radially inwardly directed oil ports converging to a generally cylindrical reactor throat, and a generally cylindrical reaction section connected to the generally cylindrical reactor throat, said generally cylindrical reaction section having a diameter sufficiently large to define an abrupt expansion in the flow path.

2. A carbon black reactor as in claim 15 further comprising a plurality of means defining tunnels opening into the annulus through the second tubular member in a generally radially inward direction toward the longitudinal axis of the carbon black reactor at a longitudinal position as measured by a centerline of each tunnel falling between the first end of the first tubular member and the second end of the first tubular member, said tunnels being generally circumferentially equally angularly spaced from each other.

3. A carbon black reactor as in claim 2 wherein the upstream end of the first tubular member bears cutouts or scallops circumferentially oriented with respect to the tunnels so that the maximum depth as measured longitudinally of the cutout or scallop falls between the center lines of the tunnels, when viewed from the perspective of the point of intersection of the longitudinal axis and the closure.

4. A carbon black reactor as in claim 3 wherein the means defining the oxidant gas distributor section is formed from metal and the refractory means defining the generally cylindrical precombustion zone is formed from refractory.

5. A carbon black reactor as in claim 4 wherein the means for introducing a fuel gas comprises a fuel gas tube for the introduction of fuel extending through the closure on the first end of the second tubular member into the generally cylindrical precombustion zone.

6. A carbon black reactor as in claim 5 wherein the refractory means defining the generally cylindrical precombustion zone further defines an annular choke positioned in the flow path adjacent to the oxidant gas distributor section, wherein the fuel gas tube opens into the flow path at a longitudinal position spaced radially inward from the annular choke.

7. A carbon black reactor as in claim 6 further comprising an oil tube for the introduction of oil into the flow path, said oil tube being coaxially positioned within the fuel gas tube and protruding from a downstream end of the fuel gas tube for the emission of oil into the generally cylindrical precombustion zone.

8. An apparatus as in claim 7 wherein two opposed tunnels open into the annulus.

* * * * *